United States Patent [19]

Seger et al.

[11] 4,333,803
[45] Jun. 8, 1982

[54] METHOD AND APPARATUS FOR CONTROLLING THE HEAT BALANCE IN ALUMINUM REDUCTION CELLS

[75] Inventors: Edward J. Seger, Apollo; Warren E. Haupin, New Kensington, both of Pa.

[73] Assignee: Aluminum Company of America, Pittsburgh, Pa.

[21] Appl. No.: 193,597

[22] Filed: Oct. 3, 1980

[51] Int. Cl.³ .......................... C25C 3/00; C25C 3/06; C25C 3/20; G01F 15/02
[52] U.S. Cl. .................................. 204/67; 204/64 R; 204/243 R; 73/198
[58] Field of Search ..................... 204/64 R, 64 T, 67, 204/243 R, 245; 73/15 R, 198

[56] References Cited

U.S. PATENT DOCUMENTS

| | | | |
|---|---|---|---|
| 3,016,412 | 1/1962 | Ross | 136/4 |
| 3,267,726 | 8/1966 | Sellers, Jr. | 73/190 |
| 3,282,806 | 11/1966 | Long et al. | 204/243 R |
| 3,437,325 | 4/1969 | Putnam et al. | 263/32 |
| 3,503,260 | 3/1970 | Polsky | 73/361 |
| 3,900,371 | 8/1975 | Chaudhuri | 204/67 |
| 3,918,300 | 11/1975 | Weisstuck | 73/15 R |
| 4,045,309 | 8/1977 | Andersen | 204/67 |

OTHER PUBLICATIONS

"Calculating Thickness of Containing Walls Frozen From Melt", by W. E. Haupin, *Journal of Metals*, Jul. 1971.
"Variations of Side Lining Temperature, Anode Position and Current/Voltage Load in Aluminum Reduction Cells", by Paulsen et al, *Light Metals*, 1980.

*Primary Examiner*—Howard S. Williams
*Attorney, Agent, or Firm*—David W. Brownlee

[57] ABSTRACT

A method and apparatus are provided for maintaining a predetermined energy balance in a device, such as an aluminum reduction cell. The apparatus includes a relatively short and thin heat flow sensor having a first and second thermocouple located within opposite closed ends of a hollow thermally conductive body. Each thermocouple is composed of two wires of the same dissimilar metals. The sensor is secured by one closed end of the sensor body to an outside surface of the wall member to extend substantially perpendicular to the location on the wall without significantly affecting the heat flow from the wall surface being measured. A first wire of each thermocouple is of the same metal for electrically connecting the junctions of each thermocouple. The second wire of each thermocouple extends to a location intermediate the closed ends of the sensor body and is electrically connected to an instrument responsive to the electrical potential between the first and second thermocouples. A control means uses the electrical signal to determine the heat flow through the wall member as a function of the temperature difference between the thermocouples and to maintain a predetermined energy balance of the system by adjusting the amount of energy added to the system. The method and apparatus also control the frozen lateral ledge thickness of an aluminum reduction cell.

19 Claims, 7 Drawing Figures

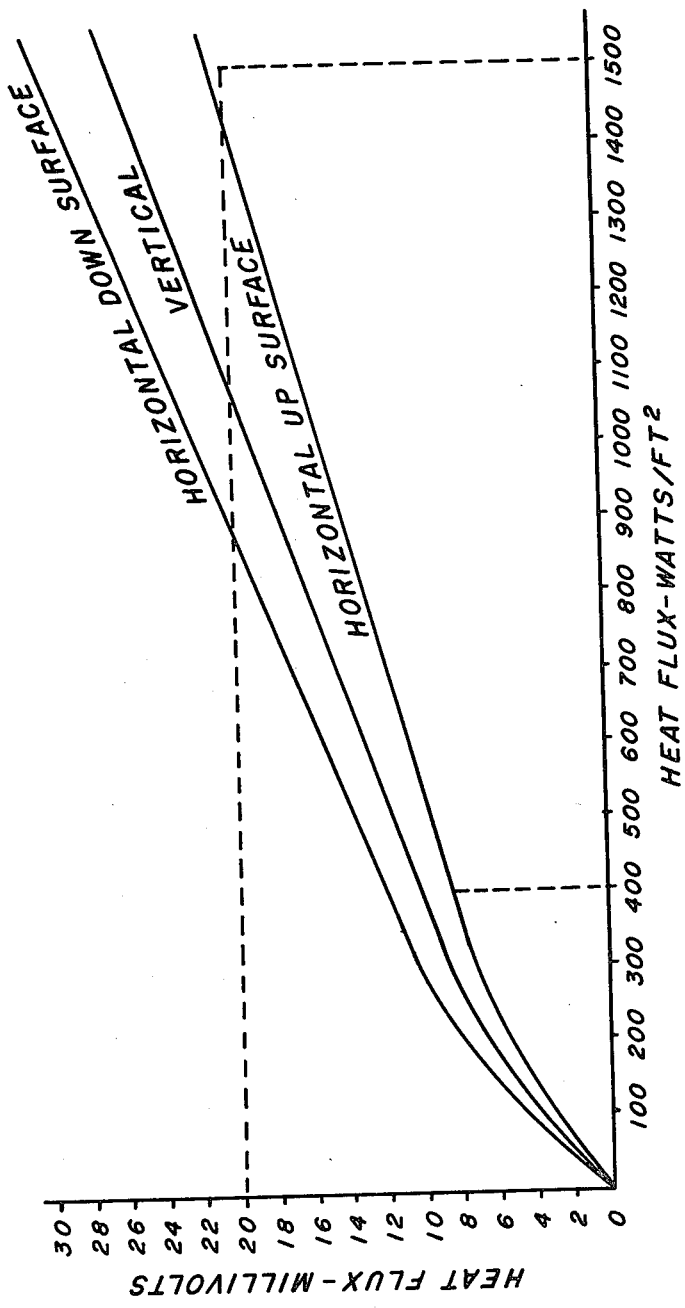
FIG. 4.
FIG. 5.
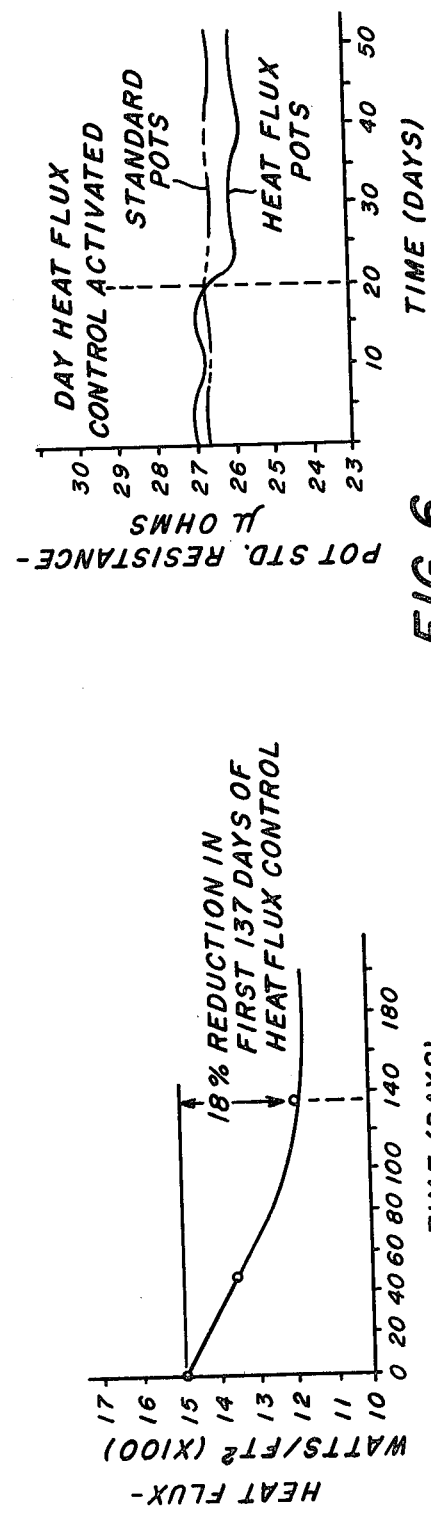
FIG. 6.

METHOD AND APPARATUS FOR CONTROLLING THE HEAT BALANCE IN ALUMINUM REDUCTION CELLS

BACKGROUND OF THE INVENTION

This invention relates to a method and apparatus for determining heat flux through heated wall members of heat emitting equipment. More particularly, the invention relates to a method and apparatus for controlling the energy balance in a molten salt reduction cell by determining the heat flux through the cell walls and thereafter adjusting the energy added to the cell to control frozen electrolytic lateral ledge thickness.

Control of heat energy may be an important consideration in the proper operation of rotary kilns, furnaces and molten salt reduction cells, for example. Heat balance control can singly or in combination maximize rates of reaction, minimize heat losses and stabilize operation of the device. For example, in aluminum reduction cells, it is desirable to operate a cell with a nearly constant frozen lateral ledge or side crust layer for most efficient operation. Freezing and melting of the side crust due to changes in the cell heat balance can theoretically be kept within small limits by adjusting the cell energy input based on crust thickness measurements. However, the side crust generally cannot be measured directly on a regular basis for all cells.

It has been suggested that the thickness of the lateral ledges of frozen electrolyte in a cell for the electrolytic recovery of aluminum can be controlled by using the changes of level of the anode. U.S. Pat. No. 3,900,371, issued Aug. 19, 1975, discloses a method of moving the anode beam to minimize a difference between the measured instantaneous ohmic cell resistance and the base resistance. It has also been suggested that the energy balance in an aluminum reduction cell can be controlled by measuring temperature in the side cathodic lining of the cell and comparing the measured temperature with a reference temperature. U.S. Pat. No. 4,045,309, issued Aug. 30, 1977, discloses such a method whereafter the immersion level of the anodes is adjusted within the electrolyte. The method involves a certain time lag which permits the method to be useful for slow disturbances in the heat balance; however, the system will be unable to correct faster changes.

The interrelationship of many factors of a reduction cell are the subject of an article entitled "Variations of Side Lining Temperature, Anode Position and Current-/Voltage Load in Aluminum Reduction Cells", by Paulsen et al, *Light Metals,* 1980, which reports an investigation concerning the dynamic behavior of the side ledge thickness and the combined data of temperature, anode position and current/voltage to give information suited for computer control of the cell.

Calculated and measured values of heat fluxes can be used in determining the thickness of frozen ledges within a molten salt reduction cell, as shown in the article entitled "Calculating Thickness of Containing Walls Frozen from Melt", by W. E. Haupin, *Journal of Metals,* July 1971. A rise in heat flux indicates a thinning of the ledge and a lowering in heat flux indicates a thickening of the ledge. Melting of the ledge absorbs heat and freezing of the ledge gives up heat tending to hold the electrolytic bath temperature constant. Under aggressive conditions in a molten salt reduction cell, for example, it is sometimes impractical to measure the temperature or heat flux within a furnace or reduction cell. Measurement of heat flux through the wall, however, appears to be more sensitive to changes in heat balance than measurements of absolute temperature within the electrolyte and offers an opportunity to give better control to aluminum reduction cells. The use of heat flow transducers or sensors to measure heat passing through the walls of the cell can aid the control of heat input and maintain a more constant balance of the cell.

Heat flow sensors to determine heat flux, essentially in one dimension along the axis of a probe and thereby control heat input into an apparatus to maintain heat balance are known. U.S. Pat. No. 3,267,726, issued Aug. 23, 1966, relates to a probe arranged on a longitudinal axis having a probe member and a support member attached as by welding to the outer surface of the wall through which the heat flux is to be determined. Arranged in the probe are thermocouple junctions 26 and 23 which provide the heat transfer measuring function between the hot junction 26 extending to the interior surface of the wall and the junction 23 located outside the wall. U.S. Pat. No. 3,437,325, issued Apr. 8, 1969, similarly discloses a control apparatus for a rotary kiln by measuring the heat loss through walls of the kiln using differential thermocouple locations with innermost thermocouple $88'$ and outermost thermocouple $86'$.

Such heat flow sensors are more complicated than thermocouple devices which measure temperature. U.S. Pat. No. 3,016,412, issued Jan. 9, 1962, discloses a thermocouple device having an elongated tubular body 1 of refractory or high heat resistant material such as stainless steel or Inconel having mounted therein a pair of thermocouple lead wires forming a bimetallic junction. U.S. Pat. No. 3,503,260, issued Mar. 31, 1970, relates to a thermocouple pyrometer using thermocouple leads of constantan and chromel and in which the thermocouples can be serially connected.

What is needed, however, is a method and apparatus for measuring heat flux from the wall of a furnace or reduction cell which is inexpensive and less complicated than prior art devices, yet takes advantage of the heat flux measurement as being more sensitive to changes in heat balance than temperature in order to give a better control of the reduction cell. The apparatus should include an inexpensive heat flow sensor that outputs a relatively large signal but that is very small and does not interrupt or affect the heat flow from the surface being measured. Furthermore, the apparatus should be capable of operating at surface temperatures up to 800° C. and it should be able to be quickly installed on hot wall surfaces of the cell or furnace without the need to shut down the cell or furnace. The method and apparatus should also have the capability of measuring surface temperature as well as the heat flow from the wall member being measured.

SUMMARY OF THE INVENTION

In accordance with the present invention, an automatic control apparatus for maintaining a predetermined energy balance in a furnace or cell comprises a relatively short and thin heat flow sensor having a first thermocouple and a second thermocouple located within opposite closed ends of a hollow thermally conductive body. Each thermocouple is a bimetallic junction of a first and second wire of the same dissimilar metals and is electrically insulated from the conductive body. The first wire of the first thermocouple and the first wire of the second thermocouple are of the same metal and electrically connect the junctions of the first and second thermocouples. The second wire of the first and second thermocouples each extends to a location intermediate the closed ends of the body and to an instrument responsive to the electrical potential between the first and second thermocouples. The sensor is secured by one closed end of the sensor body to an outside surface of the wall member to extend substantially perpendicular to a location on the wall without significantly affecting the heat flow from the wall surface being measured. The instrument responsive to the electric potential measures an electrical signal generated by the temperature difference between the first and second thermocouples of the sensor. A means is provided for determining the heat flow through the wall member as a function of the temperature difference and maintaining the predetermined energy balance by adjusting the amount of energy added. The apparatus for sensing the heat flow can be interfaced with the computer to aid control of reduction cells, for example, by controlling the frozen ledge thickness and result in a more stable bath ratio ($NaF/AlF_3$) and stable reduction cell.

A method of controlling the energy balance using the apparatus is also provided.

BRIEF DESCRIPTION OF THE DRAWINGS

FIG. 4 is a calibration curve of the sensor of the present invention.

FIG. 5 is a graph of heat flux versus time for an aluminum reduction cell including the present invention.

FIG. 6 is a comparison graph of pot average standard resistance versus time for a line of typical aluminum reduction cells and cells controlled by the present invention.

DETAILED DESCRIPTION OF THE PREFERRED EMBODIMENTS

Generally, the method of the present invention may be useful on kilns, furnaces and molten salt reduction cells where heat flux measurements would provide useful data in the efficient operation of the equipment. For purposes of brevity, the method and apparatus of the present invention will be described with regard to heat flux measurements on aluminum reduction cells though numerous other applications are within the scope of the present invention.

Figure 1:
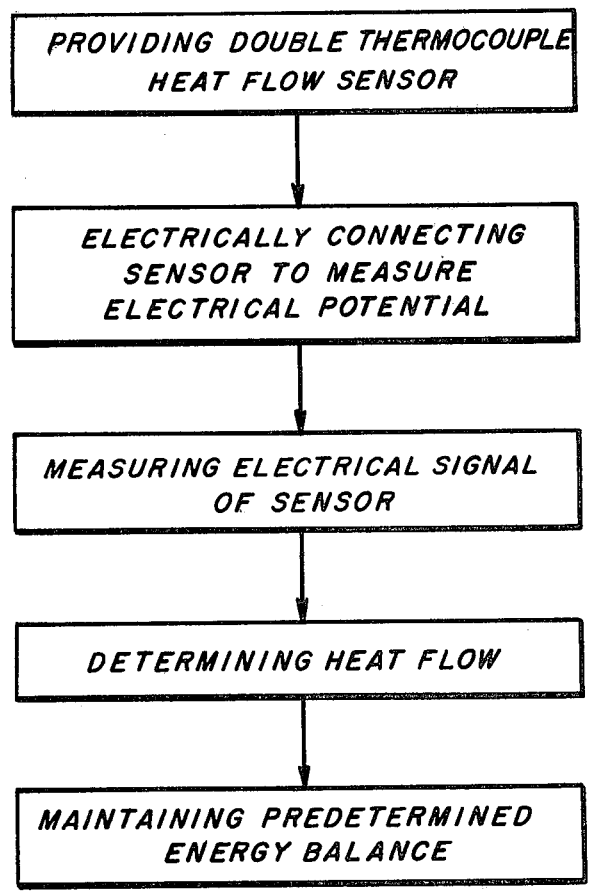
FIG. 1 is a schematic flow diagram of the method of the present invention.

Generally, FIG. 1 illustrates a flow chart of the method of the present invention which includes providing a double thermocouple heat flow sensor and electrically connecting the sensor to measure the electrical potential between the two thermocouples. From that measured electrical signal, the heat flow from the reduction cell can be determined, a predetermined energy balance can be maintained by adjusting the energy input into the reduction cell and the thickness of the frozen electrolyte lateral ledge can be controlled.

Figure 2:
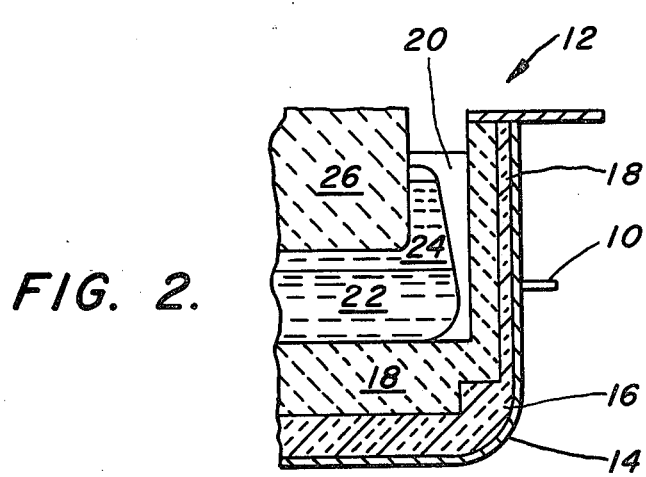
FIG. 2 is a cross-sectional view of a portion of an aluminum reduction cell showing a heat flow sensor of the present invention.

FIG. 2 is a cross-sectional view of a portion of a reduction cell 12 having a double thermocouple heat flow sensor 10 attached to the outer wall of the cell. Cell 12 is of a conventional structure having an outer shell or sheathing 14, usually steel, and an inner thermal insulation 16 between the outer sheathing 14 and inner carbonaceous lining 18 on the sides and bottom of the cell. When in operation, cell 12 will also include molten aluminum 22 and electrolytic bath 24 in which a carbonaceous anode 26 is immersed. It is also conventional to have a frozen electrolytic lateral ledge or side crust layer 20 extending along the interior of the sides of the cell 12 defining a cavity containing molten aluminum 22 and bath 24. Heat flow sensor 10 is shown attached to the outer sheathing 14 of cell 12 for measuring heat flux. Sensor 10 is relatively short, thin and thermally conductive to act as a heat radiation/convection fin for heat to travel along the sensor for measuring heat flux without significantly affecting the heat flow from the wall surface being measured.

Figure 3:
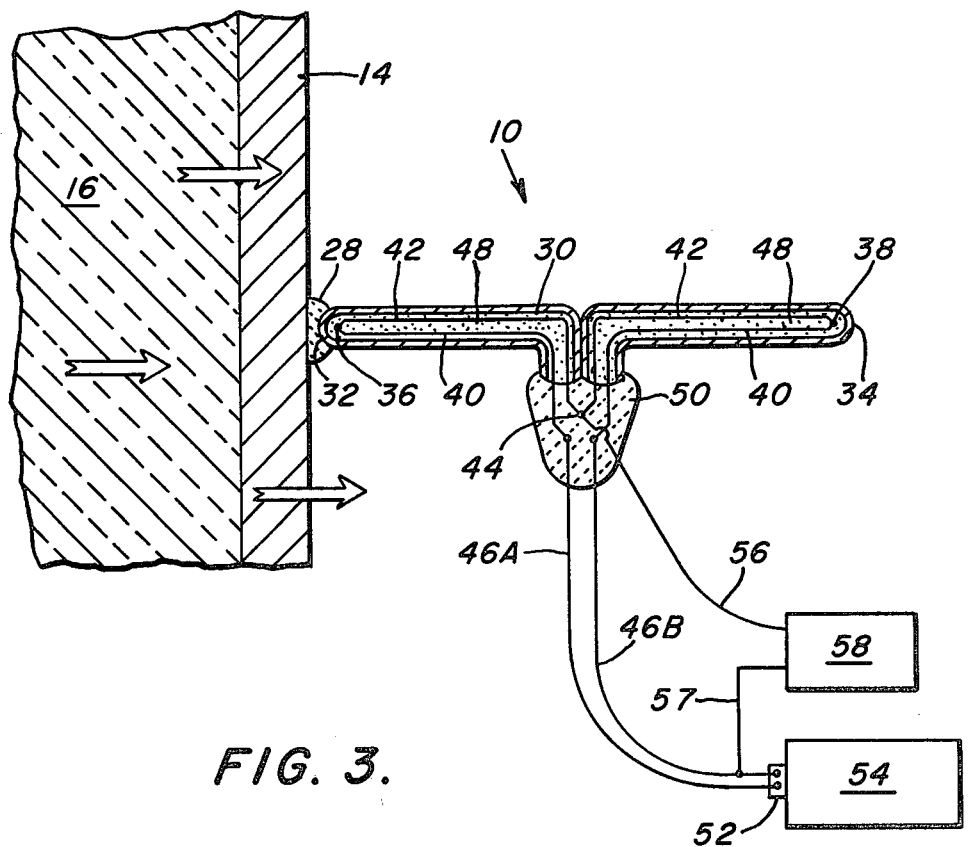
FIG. 3 is an enlarged partial cross-sectional view of the sensor in FIG. 2.

FIG. 3 is an enlarged cross-sectional view of FIG. 2 illustrating the structure of heat flow sensor 10 of the present invention for measuring heat flow (shown by the arrows) from cell 12. Heat flow sensor 10 is shown including a close-ended hollow thermally conductive body 30 having therein a first thermocouple 36 at closed end 32 of sensor 10 and a second thermocouple 38 at closed end 34 at the opposite end of sensor 10. Body 30 can be made of any of various materials to provide sufficient rigidity to protect the thermocouples contained therein, as long as it is made of a thermally conductive material, such as stainless steel or Inconel. Body 30 may be a one-piece tubular body or may be made from two or more tubular portions secured together. FIG. 3 illustrates sensor 10 preferably made from two separate tubular members.

Figure 3A:
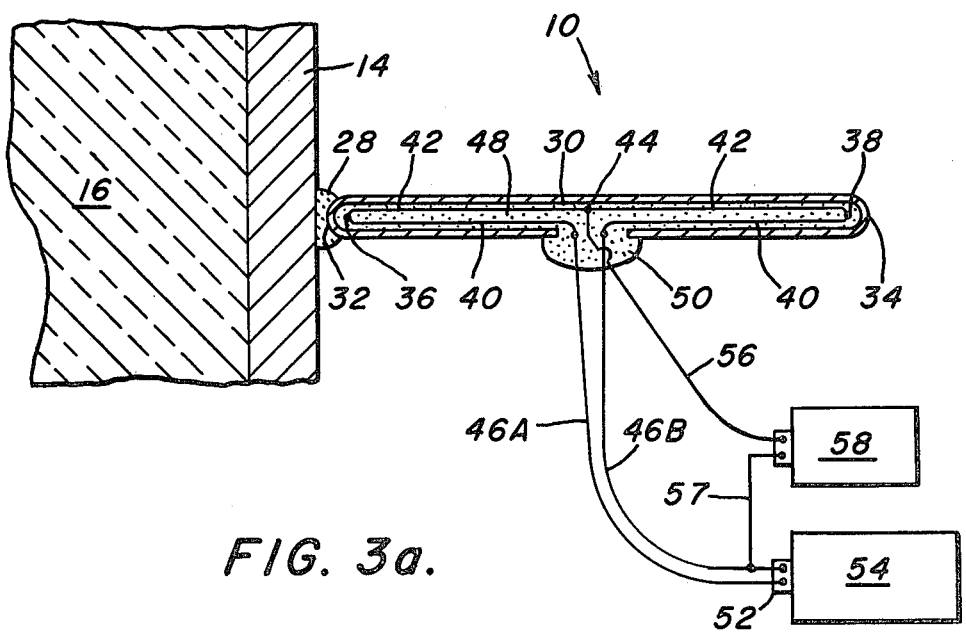
FIG. 3a is an alternate embodiment of the sensor of FIG. 3.

In an alternative embodiment of FIG. 3a, body 30 of sensor 10 is shown to be of one-piece tubular construction having an access opening intermediate the closed ends for electrically connecting the thermocouples. Such a one-piece body may be an advantageous sensor configuration provided the economics and techniques of fabricating are desirable.

Sensor 10 preferably includes a generally elongated body 30 which can be attached or secured to an outside surface of the wall member of the reduction cell by one closed end 32 or 34 of the sensor body 30 which extends substantially perpendicular to a location on the wall. Sensor 10 may be secured by welding, preferably by capacitor discharge welding which permits quick and efficient attachment of sensor 10 to the outside wall of reduction cell 12 even while the cell is in operation. It is important that weld 28 securing sensor 10 to sheathing 14 be small in cross section such as not to significantly affect the heat flow from the wall surface being measured at the point of attachment.

The overall size of sensor 10 is a critical feature of the present invention. The sensor must be relatively short and thin to minimize erroneous effects that could be caused by ambient air movement and temperature of the air surrounding the aluminum reduction cell. Sensor 10 may be less than 3 inches but more than 1 inch in length. The cross-sectional dimension, width or diameter, should be less than ¼ inch but can be as small as is practically possible to make. Preferably, the sensor ranges from 1½ to 2½ inches long with a most preferred length of about 2 inches and a width on the order of 1/16 inch in diameter. If the length of the sensor is too short, then there will be an insufficient temperature difference between the first and second thermocouples 36 and 38 within sensor 10 such that the electrical signal output may be more difficult to measure.

Development work established the criticality of the length as a result of numerous tests of sensors of varying length. Sensor 10 of FIG. 3 having about a 1/16 inch diameter was tested on the sides and bottoms of various aluminum reduction cell pots and calibrated for measuring heat flux. It was found that the length of about 2 inches unexpectedly provided a sensor that produced an electrical signal that was a function only of the position of the surface (i.e. vertical or horizontal) being measured and the heat flux from the surface. No correction or calibration was required for surface temperature, ambient temperature or varying air currents. The calibration curves are shown in FIG. 4 and will be discussed below.

Sensor 10 includes a first thermocouple located within body 30 adjacent closed end 32 of sensor 10. As shown in FIG. 3, first thermocouple 36 is the hot junction thermocouple whereas second thermocouple 38 located within body 30 adjacent closed end 34 is the cold junction thermocouple. Each thermocouple is a bimetallic junction formed by two electrically conducting wires 40 and 42. First thermocouple and second thermocouple are each comprised of two wires 40 and 42 of the same dissimilar metals. Wires 40 and 42 may be made of any of various metals having different thermoelectric potential properties. Some conventional thermocouple materials are copper, alumel, iron, constantan and chromel. Preferably chromel and constantan wire may be used in order to reduce oxidation of lead wires from sensor 10 to recording instruments and because such wire materials generate a relatively high electromotive force (EMF) signal. It does not appear significant which material is used for wire 40 and which is used for wire 42 as long as each wire is electrically connected to responsive instruments by wire of the same material.

The thermocouples 36 and 38 located within body 30 of sensor 10 are electrically connected together. As shown in FIG. 3, first wire, wire 42, of first thermocouple 36 is electrically connected with wire 42 of the same metal of second thermocouple 38 at a location intermediate the closed ends 32 and 34 of sensor body 30. Wire 42 of each thermocouple may be electrically connected within body 30 or wires 42 may exit body 30 through an opening or openings at a location intermediate closed ends 32 and 34, as shown in FIG. 3. A single wire which also acts as the first wire, wire 42, of each thermocouple 36 and 38 in sensor 10 may be used to electrically connect the junctions of thermocouples 36 and 38, as shown in FIG. 3a. It is also shown in FIG. 3 that each second wire, wire 40, of first thermocouple 36 and second thermocouple 38 extends out of sensor body 30 at a location intermediate the closed ends 32 and 34 of sensor body 30. In the alternative, wire 40 of each thermocouple may terminate within body 30 at a location intermediate the closed ends without extending out of sensor body 30. Intermediate location means a location between closed ends 32 and 34 and preferably about half way between ends 32 and 34.

It has been found that connecting electrical leads to first and second thermocouples 36 and 38 at a location intermediate the ends provides a sensor that can be calibrated with no significant variation in output between individual sensors. Development experience taught that electrically connecting the first and second thermocouples adjacent the cold junction end of the sensor resulted in each individual sensor having a peculiar calibration curve. There was little or no repeatability between individual sensors. Sensor 10 of the present invention, however, has overcome those problems.

Preferably, heat flow sensor 10 of the present invention is arranged with the electrical connections between thermocouples 36 and 38 of sensor 10 at locations intermediate the closed ends of body 30. Such an arrangement facilitates body 30 and its contents to act as a heat radiation/convection fin so that heat from the reduction cell can travel along the tube and the contents with little impediment. Heat flow sensors made in accordance with the present invention provide dependable results with the output of the cold junction thermocouple 38 that can be duplicated in order to achieve the same EMF output for each sensor.

Thermocouples 36 and 38 are electrically insulated from thermally conductive body 30 by any of various conventional refractory materials. Preferably, magnesium oxide (MgO) has provided good results. Furthermore, where wires 40 and 42 extend out of conductive body 30 of sensor 10, a conventional refractory cement material 50, such as sauereisen cement, may be used to insulate thermocouple wires 40 and 42 and to securely attach the wires to sensor 10 to prevent accidental detachment. FIG. 3 illustrates second wire 40 of first thermocouple 36 electrically connected to wire 46A and second wire 40 of second thermocouple 38 electrically connected to wire 46B. Connection to wires 46A and 46B may be made inside sensor body 30 or outside as shown in FIG. 3. As further shown in FIG. 3, wires 40 from each thermocouple may be connected to lead wires 46A and 46B, made of the same material as wires 40. Wires 46A and 46B are electrically connected by a plug 52 into an instrument 54 responsive to the electrical potential between the first thermocouple 36 and second thermocouple 38. The measured signal in instrument 54 can then be used to determine the heat flow through the cell wall as a function of the temperature difference and be used to maintain the energy balance of the cell.

It has been found that sensor 10 of the present invention generally can produce more than 10 millivolts and generally between 15 to 20 millivolts output when attached to the side of an aluminum reduction cell 12. Preferably, when heat flow sensor 10 is located along the sides of the cell, it is below the level or interface of molten aluminum 22 and electrolytic bath 24. Preferably, sensor 10 located on the side of a cell 12 is at a level which nearly always is opposite molten metal in the cell even after tapping out some metal. Such a location may be about 2 inches below the minimum molten aluminum height in cell 12. Furthermore, a plurality of sensors 10 can be located at the same level about the perimeter of cell 12 with sensors 10 connected in series. Serially connecting sensors 10 will result in a summing of the EMF output of each sensor. A resultant average signal can be provided from the summing if desired. An advantage to such series connections would result in a larger signal which would be easier to measure and thus provide a further means to minimize any fluctuations in heat flux measurements. Sensors 10 can be serially connected by electrically connecting each sensor by wires 46A and 46B so that only one lead wire 46A, 46B and plug 52 would be connected to recording instrument 54.

Calibration of sensor 10 provides for conversion of the millivolt signal generated by the sensor to heat flux in watts/ft$^2$. For example, the sensor 10 was calibrated for locations on the horizontal top and bottom and vertical side of a heat source device giving results as shown in FIG. 4. Sensor 10, which was 2 inches long and 1/16 inch in diameter, illustrates a calibration from 20 watts/ft.$^2$ to about 1500 watts/ft.$^2$ as a function of the surface position measured and heat flux. The curves, which are developed by computer analysis, below about 400 watts/ft.$^2$ generally follow a quadratic equation and above about 400 watts/ft.$^2$, the curves are linear. The curves show that sensor 10 provides more than a one millivolt output at 40 watts/ft.$^2$ and more than 20 millivolts at 1500 watts/ft.$^2$.

The apparatus of the present invention also facilitates measurement of the temperature at either the hot or cold junction of sensor 10 in addition to heat flux. A third wire 56 made of the same material as wires 42 of first and second thermocouples 36 and 38, respectively, can be connected to wires 42, such as at a point 44 intermediate the closed ends of body 30. A fourth wire 57 made of the same material as wires 40 can be electrically connected to wire 40 of either thermocouple 36 or 38, respectively, by either wires 46A or 46B. Wires 56 and 57 may be electrically connected to a temperature recording instrument 58. The effect is to electrically connect first wire 42 of a thermocouple by third wire 56 and second wire 40 of the same thermocouple by fourth wire 57 to instrument 58. The combination 56–46A will give the hot junction temperature at shell 14. The combination 56–46B will give the cold junction temperature.

To use the apparatus and method of the present invention, heat flow sensor 10 can be a preassembled unit having first and second thermocouples 36 and 38 arranged within hollow body 30 and electrically insulated from body 30. The particular configuration of body 30, such as shown in FIGS. 3 and 3a, and other configurations depend on manufacturing capabilities however. At a predetermined location on the sides and perimeter of an aluminum reduction cell, sensors 10 can be attached to the outer steel sheathing 14 such as by capacitor discharge welding. The outer surface temperature of the sheathing 14 may range up to 800° C. and the heat flow sensors 10 of the present invention are operable up to that temperature. Sensors 10 can then be electrically connected either individually or in series to a recording instrument 54 responsive to the electrical potential generated by the temperature difference between first and second thermocouples 36 and 38 of a heat sensor 10.

The temperature difference which produces an electrical signal can be used to determine the heat flow through the cell wall as a result of calibration of the sensor outputs. Such calibration can convert temperature differences directly to heat flux in BTU/hr.-ft.$^2$ or watts./ft.$^2$. A computer can be used to convert the sensor outputs through calibration equations. As a result of determining the rate of heat flow, the predetermined energy balance of the aluminum reduction cell can be maintained by adjusting the amount of energy added to the cell depending upon the increase or decrease in the heat flux measured at the cell wall. A rise in heat flux indicates a thinning of the frozen electrolyte ledge and a decrease in the heat flux indicates a thickening of the ledge 20. In other words, if the cell is fed more energy than it radiates, the frozen ledge 20 will melt, while the opposite will be the case if the energy balance is negative.

The electric signals from the heat flow sensors 10 can be connected through recording instruments 54 and 58 to a computer to aid in controlling the energy balance of a reduction cell 12. Such control has provided encouraging results. As seen from FIG. 5, a graph of heat flux in watts/ft.$^2$ versus time, the bath-metal interface heat flux has been lowered anywhere from 16 to 18%. Furthermore, the average standard control resistance on several pots, as shown in FIG. 6 in a graph of pot standard resistance in ohms versus time, has been lowered anywhere from 3 to 4% when compared to the average standard control resistance of the remaining pots not equipped with the present invention. These results indicate that the frozen ledge 20 on the cell can be controlled and maintained at a thickness which will in turn stabilize bath ratio (NaF/AlF$_3$), cavity size in the pots and metal depths in the reduction cell.

Though heat flow sensors 10 have been described as being secured to the sides of aluminum reduction cells 12, the sensors may be located in other areas not affected by the frozen electrolytic ledge 20, such as on the bottom of the cell for purposes other than pot control, for example, to evaluate insulation deterioration.

The present invention thus provides a method and apparatus which can reduce energy consumption in aluminum reduction cells and other devices such as furnaces and rotary kilns where heat flux measurements can be useful for controlled efficiency. The apparatus of the present invention can be easily installed on existing equipment and is operable up to relatively high temperatures of 800° C. The apparatus of the present invention is much lower in cost than heat flow sensors of the prior art to produce a relatively large output signal which permits the use of the more sensitive heat flux measurements to control cells.

Although preferred embodiments and alternative embodiments have been illustrated and described, it will be apparent to those skilled in the art that changes can be made therein without departing from the scope of the invention.

What is claimed is:

1. In an automatic control apparatus for maintaining a predetermined energy balance in a device which loses heat through wall members, the apparatus comprising:
   (a) a relatively short and thin heat flow sensor having a close-ended hollow thermally conductive elongated body, a first thermocouple therein of a junction of a first and second wire of dissimilar metals near one end of the body, near the other end of the body a second thermocouple therein of a junction of a first and second wire of the same dissimilar metals as of the first thermocouple and insulation within the body for electrically insulating the wires from the sensor body;
   (b) said sensor having the first wire of the first thermocouple and the first wire of the second thermocouple being of the same metal for electrically connecting the junction of the first thermocouple with the junction of the second thermocouple, and having the second wire of each of the first and second thermocouples extending to a location intermediate the closed ends of the sensor body;
   (c) said sensor attachable by one closed end of the sensor body to an outside surface of the wall member to extend substantially perpendicular to a location on the wall member without significantly affecting the heat flow from the wall surface being measured;
   (d) an instrument responsive to the electrical potential between the first and second thermocouples for measuring an electrical signal generated by a temperature difference between the first and second thermocouples of said sensor, said instrument connected to the second wire of each of the first and second thermocouples at a location intermediate the closed ends of the sensor body; and (e) control means for determining the heat flow through the wall member as a function of the temperature difference and maintaining the predetermined energy balance by adjusting the amount of energy added to the device.

2. The apparatus as set forth in claim 1 wherein said sensor ranges from 1 to less than 3 inches long and ranges from 1/32 to less than ¼ inch wide.

3. The apparatus as set forth in claim 1 further including an instrument means responsive for measuring temperature being electrically connected to the first wire of a thermocouple by a third wire composed of the same material as the first wire of each thermocouple and being electrically connected to the second wire of the same thermocouple by a fourth wire composed of the same material as the second wire of each thermocouple.

4. The apparatus as set forth in claim 1 wherein a plurality of sensors are attached to the wall member and electrically connected in series to sum the electrical signals of each sensor.

5. The apparatus as set forth in claim 1 wherein each sensor generates a signal of more than 1 millivolt at 40 watts/ft.$^2$ and more than 20 millivolts at 1500 watts/ft.$^2$.

6. The apparatus as set forth in claim 1 wherein the device is an aluminum reduction cell adapted to contain molten aluminum, electrolytic bath and a frozen electrolytic lateral ledge therein, and wherein said sensor is attached to an outside surface of the side walls of the cell at a location below the minimum molten aluminum and electrolytic bath interface for maintaining a proper lateral ledge thickness.

7. In an automatic control apparatus for maintaining a predetermined energy balance in a molten salt reduction cell, the apparatus comprising:
(a) a relatively short and thin heat flow sensor having a close-ended hollow thermally conductive elongated body, a first thermocouple therein of a junction of a first and second wire of dissimilar metals near one end of the body, near the other end of the body, a second thermocouple therein of a junction of a first and second wire of the same dissimilar metals as of the first thermocouple and insulation within the body for electrically insulating the wires from the sensor body;
(b) said sensor having the first wire of the first thermocouple and the first wire of the second thermocouple being of the same metal for electrically connecting the junction of the first thermocouple with the junction of the second thermocouple, and having the second wire of each of the first and second thermocouples extending to a location intermediate the closed ends of the sensor body;
(c) said sensor attachable by one closed end of the sensor body to an outside wall surface of the cell to extend substantially perpendicular to a location on the wall without significantly affecting the heat flow from the wall surface being measured;
(d) an instrument responsive to the electrical potential between the first and second thermocouples for measuring an electrical signal generated by a temperature difference between the first and second thermocouples of said sensor, said instrument connected to the second wire of each of the first and second thermocouples at a location intermediate the closed ends of the sensor body, said sensor signal being a function only of the wall surface position and heat flux from the surface; and
(e) control means for determining the heat flow through the cell wall as a function of the temperature difference and maintaining the predetermined energy balance commensurate with a stable cell by adjusting the amount of energy added to the cell.

8. The apparatus as set forth in claim 7 wherein said sensor is from 1½ to 2½ inches long and less than ¼ inch in cross-sectional dimension.

9. In an automatic control apparatus for maintaining a predetermined energy balance and for controlling lateral ledge thickness of electrolyte in an aluminum reduction cell which includes molten aluminum and electrolytic bath, the apparatus comprising:
(a) a relatively short and thin heat flow sensor having a close-ended hollow thermally conductive elongated body, a first thermocouple therein of a junction of two wires of dissimilar metals near one end of the body, near the other end of the body, a second thermocouple therein of a junction of two wires of the same dissimilar metals as of the first thermocouple and insulation within the body for electrically insulating the wires from the body;
(b) said sensor having one of said wires of the first thermocouple being electrically connected with the wire of the same metal of the second thermocouple at a location intermediate the closed ends of the sensor body, and the other of the two wires of the first and second thermocouples extending out of the sensor body at a location intermediate the closed ends of the sensor body;
(c) said sensor attached by one closed end of the sensor body to an outside, substantially vertical side wall surface of the cell to extend substantially perpendicular to a location on the wall below the minimum molten aluminum and electrolytic bath interface without significantly affecting the heat flow from the wall surface being measured;
(d) an instrument responsive to the electrical potential between the first and second thermocouples for measuring an electrical signal generated by a temperature difference between the first and second thermocouples of said sensor, said instrument connected to the wires of the first and second thermocouple which extend out of the sensor body, said sensor signal being a function only of the wall surface position and the heat flux from the surface; and
(e) control means for determining the heat flow through the cell wall as a function of the temperature difference and maintaining the predetermined energy balance commensurate with a stable cell by adjusting the amount of energy added to the cell to control the lateral ledge thickness of electrolyte.

10. The apparatus as set forth in claim 9 wherein said sensor is about 1½ to 2½ inches long and about 1/16 inch in cross-sectional width.

11. The apparatus as set forth in claim 9 wherein a plurality of sensors are attached about the periphery of the cell wall at about the same level and electrically connected in series to sum the electrical signals of each sensor.

12. The apparatus as set forth in claim 9 wherein each sensor generates a signal of more than 1 millivolt at 40 watts/ft.$^2$ and more than 80 millivolts at 1500 watts/ft.$^2$.

13. In a method of controlling the energy balance in a device which loses heat through wall members, the method comprising:

(a) providing a relatively short and thin heat flow sensor at a location on the outside surface of a wall member with said sensor having a negligible effect on the heat flow from the surface to which it is attached;

(b) said sensor having a close-ended hollow thermally conductive body, a first and a second thermocouple therein each near opposite ends of the body, each thermocouple having a junction of a first and second wire of dissimilar metals, each thermocouple having the same dissimilar metals, and insulation within the body for electrically insulating the wires from the body, said sensor attached substantially perpendicular to the wall member by one closed end of the sensor body;

(c) electrically connecting the junction of the first thermocouple with the junction of the second thermocouple by the first wires;

(d) electrically connecting the second wires of each of the first and second thermocouples with an instrument responsive to the electrical potential between the first and second thermocouples, each of the second wires extending to a location intermediate the closed ends of the body;

(e) measuring an electrical signal generated by a temperature difference between the first and second thermocouples;

(f) determining the heat flow through the wall member as a function of the temperature difference; and (g) maintaining a predetermined energy balance by adjusting the amount of energy added to the device.

14. The method as set forth in claim 13 further including the step of electrically connecting an instrument means for measuring temperature by a third wire to the first wire of a thermocouple, said third wire composed of the same material as the first wire of each thermocouple, and by a fourth wire to the second wire of the same thermocouple, said fourth wire composed of the same material as the second wire of each thermocouple.

15. The method as set forth in claim 13 further including attaching a plurality of sensors on the outside wall member, electrically connecting the sensors in series and summing the signals of each sensor.

16. The method as set forth in claim 13 further providing said sensor on an outside side wall of an aluminum reduction cell containing molten aluminum, electrolytic bath and frozen electrolytic lateral ledge, said sensor attached at a location below the minimum molten aluminum and electrolytic bath interface for maintaining a proper lateral ledge thickness.

17. In a method of controlling the energy balance in a molten salt reduction cell, the method comprising:

(a) attaching a relatively short and thin heat flow sensor at a location on the outside surface of a cell wall with said sensor having a negligible effect on the heat flow from the surface to which it is attached;

(b) said sensor having a close-ended hollow thermally conductive body, a first and a second thermocouple therein each near opposite ends of the body, each thermocouple having a junction of a first and second wire of dissimilar metals, each thermocouple having the same dissimilar metals, and insulation within the body for electrically insulating the wires from the body, said sensor attached substantially perpendicular to the cell wall by one closed end of the sensor body;

(c) electrically connecting the junction of the first thermocouple by its first wire with the junction of the second thermocouple by its first wire;

(d) electrically connecting the second wires of each of the first and second thermocouples with an instrument responsive to the electrical potential between the first and second thermocouples, each of the second wires extending to a location intermediate the closed ends of the body;

(e) measuring an electrical signal generated by a temperature difference between the first and second thermocouples, the signal being a function only of the cell wall surface and heat flux from the surface;

(f) determining the heat flow through the cell wall as a function of the temperature difference; and (g) maintaining a predetermined energy balance commensurate with a stable reduction cell by adjusting the amount of heat added to the cell.

18. In a method of controlling the energy balance and lateral ledge thickness of electrolyte in an aluminum reduction cell including molten aluminum and electrolytic bath, the method comprising:

(a) attaching a relatively short and thin heat flow sensor at a location on the outside surface of a cell wall with said sensor having a negligible effect on the heat flow from the surface to which it is attached;

(b) said sensor having a close-ended hollow thermally conductive body, a first and a second thermocouple therein each near opposite ends of the body, each thermocouple having two wires of dissimilar metals, each thermocouple having the same dissimilar metals, and insulation within the body for electrically insulating the wires from the body, said sensor attached substantially perpendicular to the cell side wall by one closed end of the sensor body at a location below the minimum molten aluminum and electrolytic bath interface;

(c) electrically connecting one of said wires of the first thermocouple with the wire of the same metal of the second thermocouple at a location intermediate the closed ends of the sensor body;

(d) electrically connecting the other of the two wires of the first and second thermocouple with an instrument responsive to the electrical potential between the first and second thermocouples, said wires extending out of the sensor body at a location intermediate the closed ends of the body;

(e) measuring an electrical signal generated by the temperature difference between the first and second thermocouples, the signal being a function only of the cell wall surface and heat flux from the surface;

(f) determining the heat flow through the cell wall as a function of the temperature difference; and (g) maintaining a predetermined energy balance commensurate with a stable reduction cell by adjusting the amount of heat added to the cell to control the lateral ledge thickness of electrolyte.

19. The method as set forth in claim 18 further including attaching a plurality of sensors on the outside cell wall, electrically connecting the sensors in series and summing the signals of each sensor to determine an average sensor signal.

* * * * *